United States Patent [19]

Kitano et al.

[11] Patent Number: 4,967,240
[45] Date of Patent: Oct. 30, 1990

[54] RECORDING APPARATUS

[75] Inventors: Hiroshisa Kitano; Itaru Saito; Ken Matsubara; Kouichi Shingaki; Tomohiko Masuda; Yuji Enoguchi, all of Osaka, Japan

[73] Assignee: Minolta Camera Kabushiki Kaisha, Osaka, Japan

[21] Appl. No.: 343,525

[22] Filed: Apr. 26, 1989

[30] Foreign Application Priority Data

Apr. 26, 1988 [JP] Japan .................. 63-103101

[51] Int. Cl.⁵ .................................. G03G 15/00
[52] U.S. Cl. .................... 355/318; 355/309; 355/313; 355/319; 346/160
[58] Field of Search ........... 355/319, 320, 318, 308, 355/309, 313, 202; 346/160

[56] References Cited

U.S. PATENT DOCUMENTS

| | | | |
|---|---|---|---|
| 4,487,506 | 12/1984 | Repp et al. | 355/318 |
| 4,697,910 | 10/1987 | Kasuya | 355/202 |
| 4,697,917 | 10/1987 | Takano et al. | 355/243 |
| 4,748,470 | 5/1988 | Ibuchi | 355/318 |
| 4,750,016 | 6/1988 | Kusumoto et al. | 355/318 X |
| 4,772,917 | 9/1988 | Tani | 355/319 X |
| 4,794,419 | 12/1988 | Shibazaki et al. | 355/202 |
| 4,814,798 | 3/1989 | Fukae et al. | 346/160 |

FOREIGN PATENT DOCUMENTS 61-19033 5/1986 Japan .

Primary Examiner—Arthur C. Prescott
Attorney, Agent, or Firm—Price, Gess & Ubell

[57] ABSTRACT

A recording apparatus comprising a copying system for projecting the image of an original document onto a photosensitive member to form an electrostatic latent image thereon, and a printing system for forming an electrostatic latent image on the photosensitive member in response to image information received from a data processing machine. This recording apparatus is operable in a printing mode and a copying mode. In the printing mode, recording paper carrying an image printed in accordance with the image information is either discharged outwardly of the recording apparatus or forwarded to an automatic document feeder to serve as an original document or documents. In the copying mode, the or each original document is copied a selected number of times as in any conventional copying machine.

10 Claims, 11 Drawing Sheets

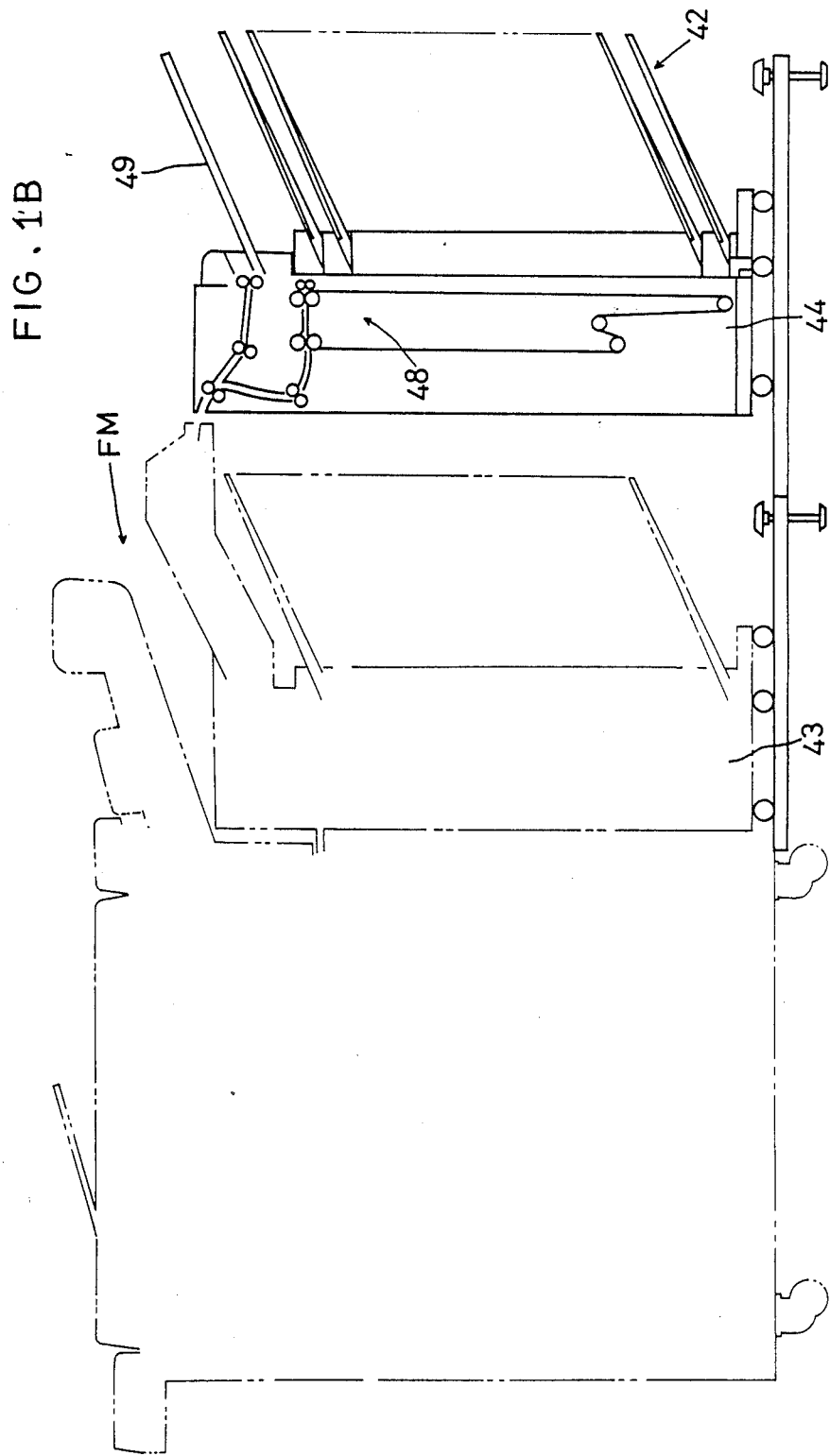

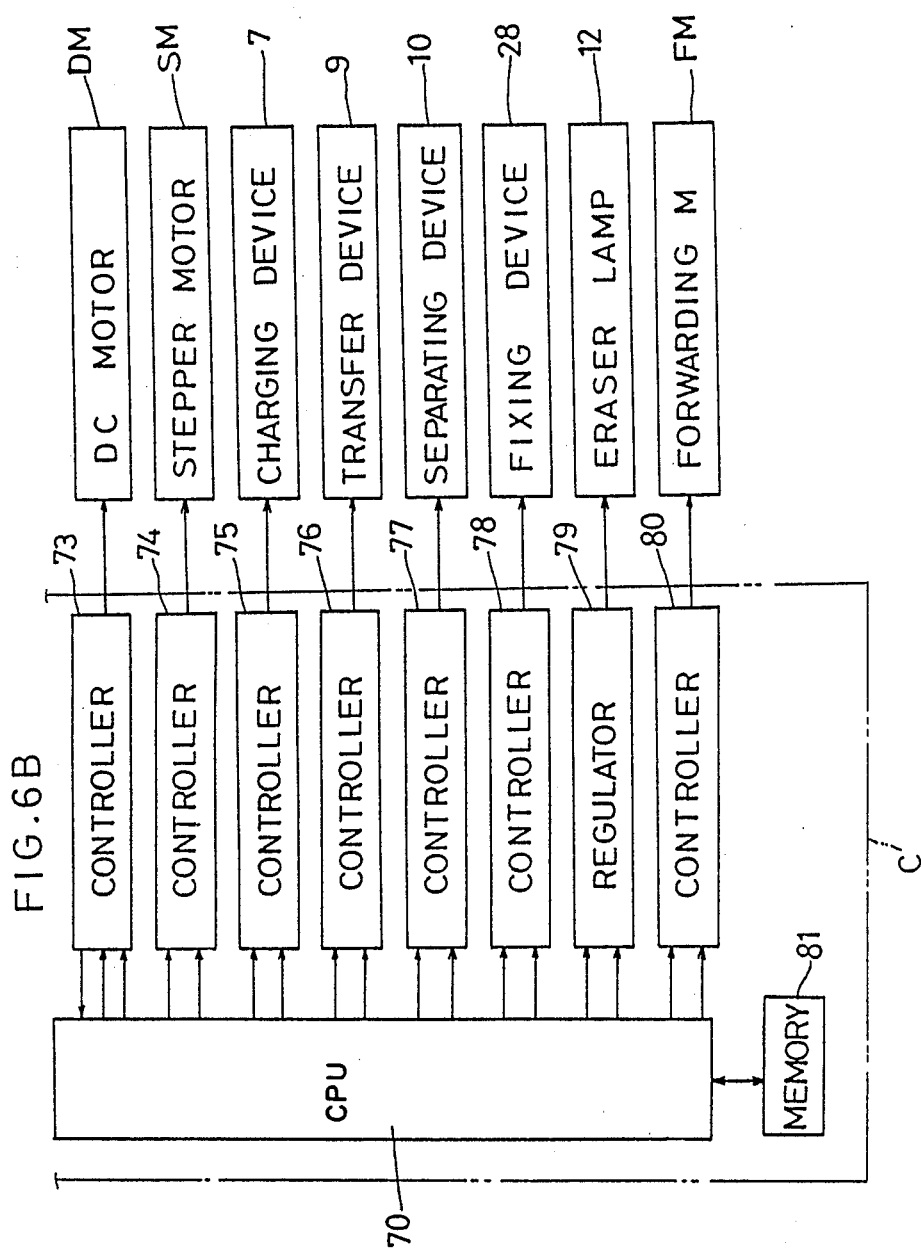

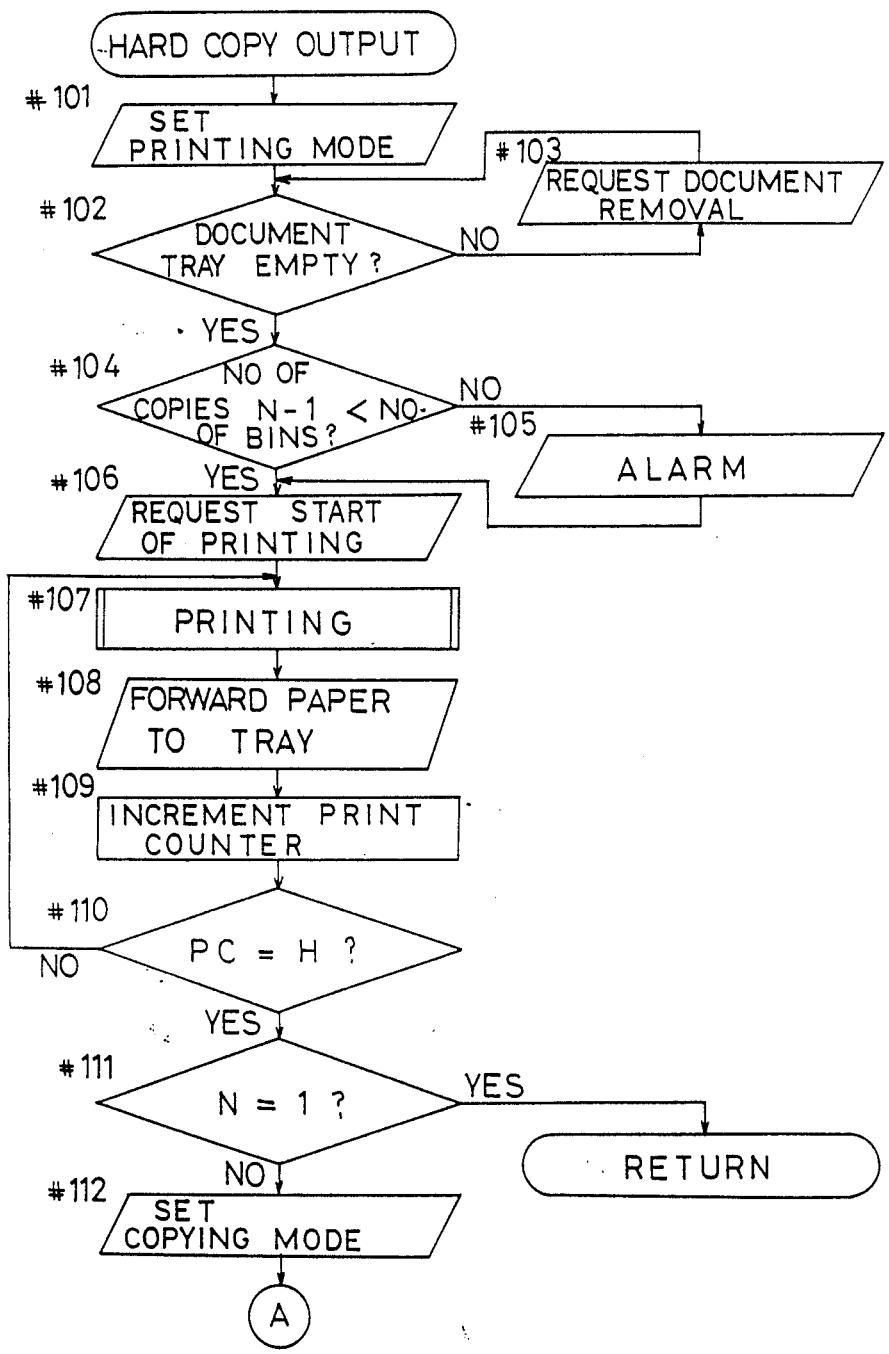

RECORDING APPARATUS

BACKGROUND OF THE INVENTION

1. Field of the Invention

The present invention relates to a recording apparatus comprising a copying system for copying an original document on a document table onto recording paper, and a printing system for printing information received from outside, whereby the recording apparatus not only has a document copying function but also acts as a hard copy output terminal of a computer and the like.

2. Description of the Prior Art

Known optical printers include a laser beam printer and an LED printer which employ an electrophotographic process. Considering such an optical printer and an electrostatic, indirect type copying machine employing the electrophotographic process, one will realize that these printer and copying machine have in common the various devices that take part in the processes subsequent to electrostatic image formation on a photosensitive member. It will become possible to achieve a recording apparatus having the above-mentioned two functions at low cost if such common devices are effectively used, e.g. by incorporating an optical printing head into the electrostatic, indirect type copying machine for converting printing information received from outside into optical information and selectively exposing surfaces of the photosensitive member.

Such an optical printing head forming part of the printing system may be disposed adjacent the photosensitive member of the copying machine in order to promote effective use of the two functions for improved operating efficiency. Where the printing system is connected to a forwarding device for supplying printed recording paper to the document table, the recording paper itself, on which image information output from a computer or the like to the printing system is printed, namely a hard copy, may be used as an original document to be copied by the copying system. It is thus sufficient to obtain the image information from the computer or the like only once even where a plurality of hard copies are required. Consequently, the computer or the like is promptly made available for other uses. Such a proposal is disclosed in Japanese Patent Publication No. 61-19033, for example.

However, the known recording apparatus noted above has the following disadvantage since printed recording paper is fed directly to the document table. No problem arises where a plurality of hard copies of a single page are produced from the image information provided by the computer or the like. An inconvenience does occur, however, where hard copies of plural pages are produced to act as original documents. That is, because the copying and printing systems share one photosensitive member, the printing system must wait to carry out a printing operation before one sheet of copying paper printed in the previous printing operation, namely a hard copy of a preceding page, and placed on the document table as an original document is copied by the copying system to produce a plurality of duplicates. Consequently, a hard copy of each page is printed in response to the image information from the computer or the like only after copying of the previous printout is completed. This requires the computer or the like acting as the image information source to output the image information intermittently to the printing system. Although the computer or the like may be used for other purposes during the standby period from one hard copy output to another, the hard copy output operation cannot be carried out continuously.

SUMMARY OF THE INVENTION

Having regard to the state of the art noted above, an object of the present invention is to improve the construction for causing the copying system to copy original documents consisting of hard copies produced by the printing system, thereby permitting a computer of the like acting as an image information source to be effectively used for other purposes.

This object is fulfilled, according to the present invention, by a recording apparatus comprising copying means for copying original documents placed on a document table onto recording paper, printing means for printing information input from outside on the recording paper, an automatic document feeder including a document feed tray for supporting a plurality of documents, and a transport mechanism for feeding the plurality of documents one after another to the document table, and a forwarding device for supplying the recording paper printed by the printing means to the document feed tray.

In the recording apparatus according to the present invention, each time a sheet of recording paper is printed by the printing means, the sheet may be supplied to the original document tray of the automatic document feeder by the forwarding device under control by control means. The document feed tray is capable of supporting a plurality of documents, while the transport mechanism is capable of feeding one document after another from the document feed tray to the document table. Where hard copies in plural pages are used for taking copies, and the copying and printing means employ the electrophotographic process sharing the same photosensitive member, one full set of hard copies of all the pages may first be produced and stored on the document feed tray, a desired number of copies being thereafter produced by the copying means. On the other hand, where the copying and printing means employ entirely different processes, once a hard copy of the first page is produced, the copying operation for feeding one hard copy after another to the document table to copy a desired number of times may be carried out in parallel with the operation for storing the plural pages of hard copies on the document feed tray. In either case, the image information may be output from a computer or the like only once during a continuous production of hard copies in the initial stage whether only one set of hard copies is required or plural sets thereof are required. Thus the computer or the like may be operated for a minimum continuous period of time required for producing the hard copies.

Recording apparatus with a automatic document feeder in particular have been diffusing solid recently, which enable an efficient copying operation. When applying the present invention to such recording apparatus, the apparatus may be modified to additionally include only the forwarding device and control means therefor.

The foregoing and other objects, features and advantages of the invention will be apparent from the following more particular description of preferred embodiments of the invention, as illustrated in the accompanying drawings.

BRIEF DESCRIPTION OF THE DRAWINGS

The drawings show a recording apparatus according to the present invention, in which:

FIGS. 1A and 1B are schematic sectional views of the recording apparatus,

FIGS. 6A and 6B are block diagrams of a control system, respectively, FIGS. 7, 8A and 8B are flow charts illustrating operation of the recording apparatus.

DESCRIPTION OF THE PREFERRED EMBODIMENTS

An embodiment of the present invention will be described hereinafter with reference to the drawings.

Figure 1A:
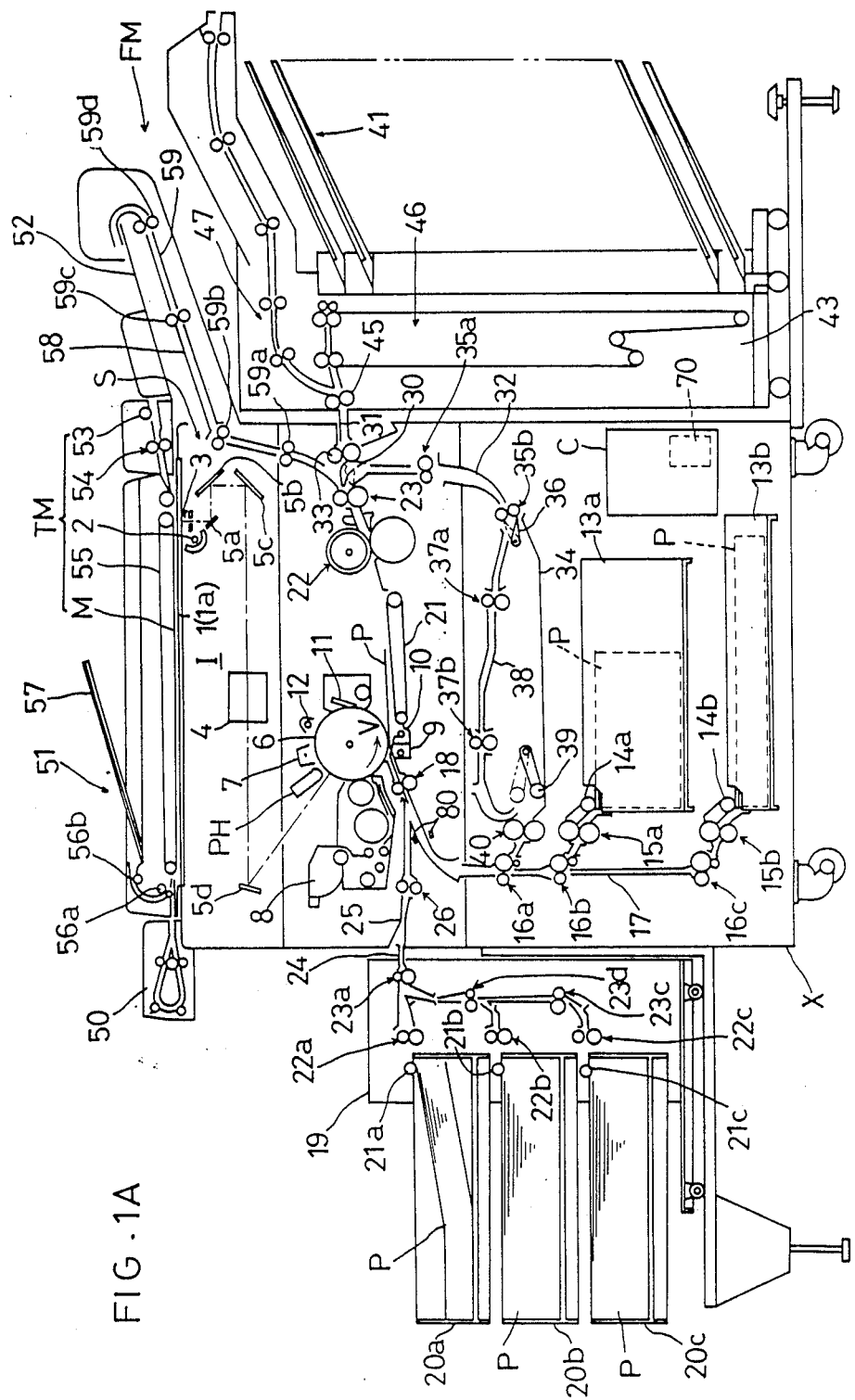

FIGS. 1A and 1B are sectional views showing an outline of a slit scan type electrophotographic recording apparatus which is one example of recording apparatus according to the present invention.

This recording apparatus comprises a document table 1 formed of a glass plate 1a, and an exposure lamp 2 for illuminating an original document M placed on the glass plate 1a. Light reflected from the document passes through a slit 3 to be projected onto a photoreceptor drum 6 by an image-forming optical system 1 including an image-forming lens 4 and a plurality of mirrors 5a–5d. The drum 6 is rotatable at a constant peripheral speed V counterclockwise in FIG. 1.

The exposure lamp 2, slit 3 and first mirror 5a constitute a scanning device g which is driven to scan the document M leftward in FIG. 1 at a predetermined speed V/n (where n is a copying magnification).

The photoreceptor drum 6, which is one example of photosensitive members, is surrounded by a charger 7 for uniformly charging the drum surface, a developing device g for applying toner to and developing an electrostatic latent image formed on the photoreceptor drum 6, a transfer device 9 for transferring the toner image to recording paper p, a separating device 10 for separating the recording paper carrying the toner image from the drum 6, a cleaning device 11 for removing excess toner adhering to the drum surface after the image transfer, and an eraser lamp 12 for erasing the electric charge from the drum surface after the image transfer.

The recording apparatus further comprises an optical printing head PH disposed between a position of the photoreceptor drum 6 to which the light from the original document M is projected and the charging device 7, for forming an electrostatic latent image on the drum 6 in response to image information input to the optical printing head PH .

Figure 2:
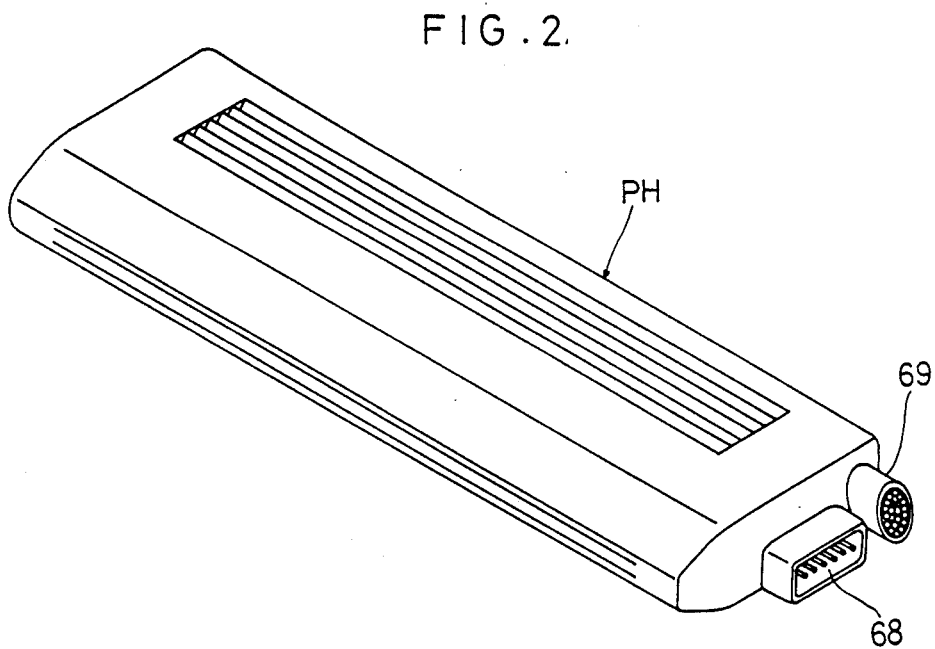
FIG. 2 is a perspective view o: an optical printing head.
Figure 3:
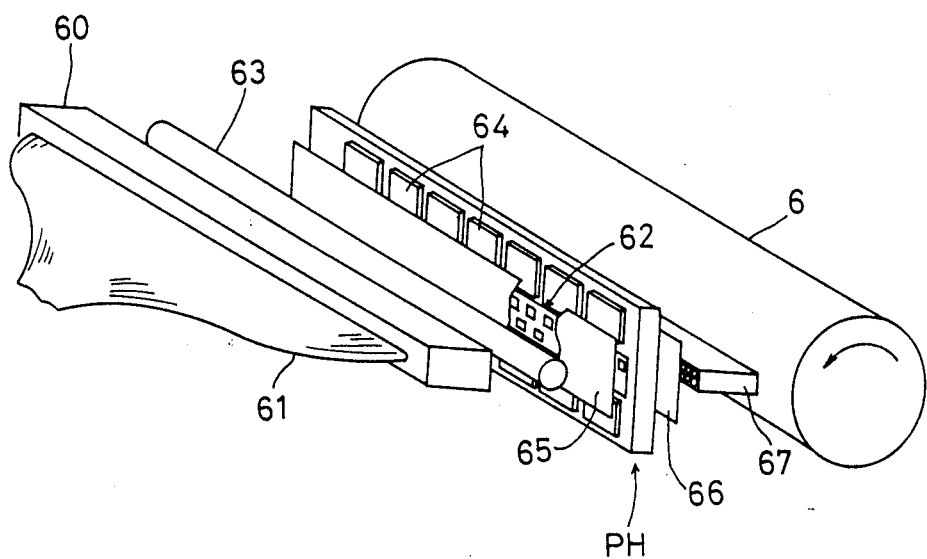
FIG. 3 is a perspective view showing the interior or the optical printing head.

As shown in FIGS. 2 and 3, the optical printing head PH includes a plurality of optical fibers 61 for leading light from a light source (not shown) to a linear light emitter 60. The light emitted uniformly from the light emitted 60 is condensed by a rod lens 63 for impingement onto a PLZT shutter array 62 having a pixel-to pixel coverage. Each shutter of the PLZT shutter array 62 is driven by a driver circuit 64. Opposed across the PLZT shutter array 62 are a polarizer 65 and an analyzer 66 having polarizing directions perpendicular to each other. A light beam having passed through each shutter of the PLZT shutter array 62 is condensed by a rod lens array 67 onto the photoreceptor drum 6.

When printing an image corresponding to the image information input to the optical printing head PH, the shutters of the PLZT shutter array 62 are selectively driven by the driver circuits 64 in response to the image information input through a connector 68. Only those light beams having passed through the shutters in an operative state for rotating the polarizing directions are allowed to travel through the analyzer 66 to impinge on the photoreceptor drum 6. As a result, an electrostatic latent image corresponding to the image information is formed on the drum 6. Reference numeral 69 in FIG. 2 denotes an optical fiber connector for inputting the light from the light source to the optical fibers 61 inside the printing head PH.

The electrostatic latent image formed by the printing head PH on the photoreceptor drum 6 is developed by the developing device B and then reaches the transfer device 9 with the rotation of the drum 6, as in the case of the image resulting from the light transmitted from the original document M on the document table 1 by the scanning device S and the image-forming optical system I.

As shown in FIG. 1, sheets of the recording paper P in two different sizes are stored on sheet feed trays 13a and 13b, respectively, which are mounted inside a main body X of the recording apparatus. The recording paper P of a designated size is picked up from the tray 13a or 13b one sheet after another by a pickup roller 14a or 14b. Then the paper P advances through a control roller pair 15a or 15b to a paper feed passage 17 including three feed roller pairs 16a–16c. Thereafter the paper P reaches a timing roller pair 18 which feeds the paper P to the transfer device 9 in synchronized relationship with formation of an electrostatic latent image on the photoreceptor drum 6.

Further, a sheet feed stacker 19 is connected laterally of the main body X. The stacker 19 includes three sheet feed trays 20a–20c arranged vertically for storing recording paper P in three sizes all of which may be different from the sizes of paper P stored on the trays 13a and 13b inside the main body X.

The recording paper P, having received the toner image from the photoreceptor drum 6 at the transfer device 9 and separated from the drum 6 by the separating device 10, is transported by a conveyer belt 21 to a fixing device 22. The fixing device 22 fixes the toner image to the recording paper P by heating and fusing the toner.

Thus, the exposure lamp 2, slit 3, image forming lens 4, mirrors 5a–5d, photoreceptor drum 6, elements 7–12 surrounding the drum 6, the described paper feed mechanism for feeding the copying paper P from the trays 13a, 13b and 20a 20c, conveyer belt 21 and fixing device 22 constitute a copying system for copying the original document M placed on the document table 1 onto the recording paper P. On the other hand, the optical printing head PH, photoreceptor drum 6, elements 7–12 surrounding the drum 6, paper feed mechanism, conveyer belt 21 and fixing device 22 constitute a printing system for printing image information input from outside on the recording paper P.

As seen from FIG. 1, an automatic document feeder 51 including an automatic reversing device 50 is mounted on the document table 1. The automatic document feeder 51 further includes a document feed tray 52 for supporting a plurality of original documents The documents N are picked up from the tray 52 one after another by a pickup roller 53, passed through a control roller pair 54, and fed by a conveyer belt 55 to a fixed position on the glass plate 1a. After a selected copying operation, each document M is discharged by transport rollers 56a and 56b onto a document discharge tray 57. Thus, the pickup roller 53, control roller pair 54 and conveyer belt 55 constitute a transport mechanism TM for successively feeding a plurality of original documents from the document feed tray 52 to the document table 1.

When carrying out duplex copying of a document carrying images on both sides, the automatic reversing device 50 of the document feeder 51 cooperates with the conveyer belt 55 to turn over the document M after one side thereof has been copied, for feeding the document M to the fixed position on the glass plate 1a. The illustrated recording apparatus further comprises a forwarding mechanism FM including forwarding passages 58 and 59 and several forwarding roller pairs 59a–59d for supplying recording paper P emerging from the fixing device 20 to the document feed tray 52 of the automatic document feeder 51 with a printed side of the paper P facing down.

Figure 4:
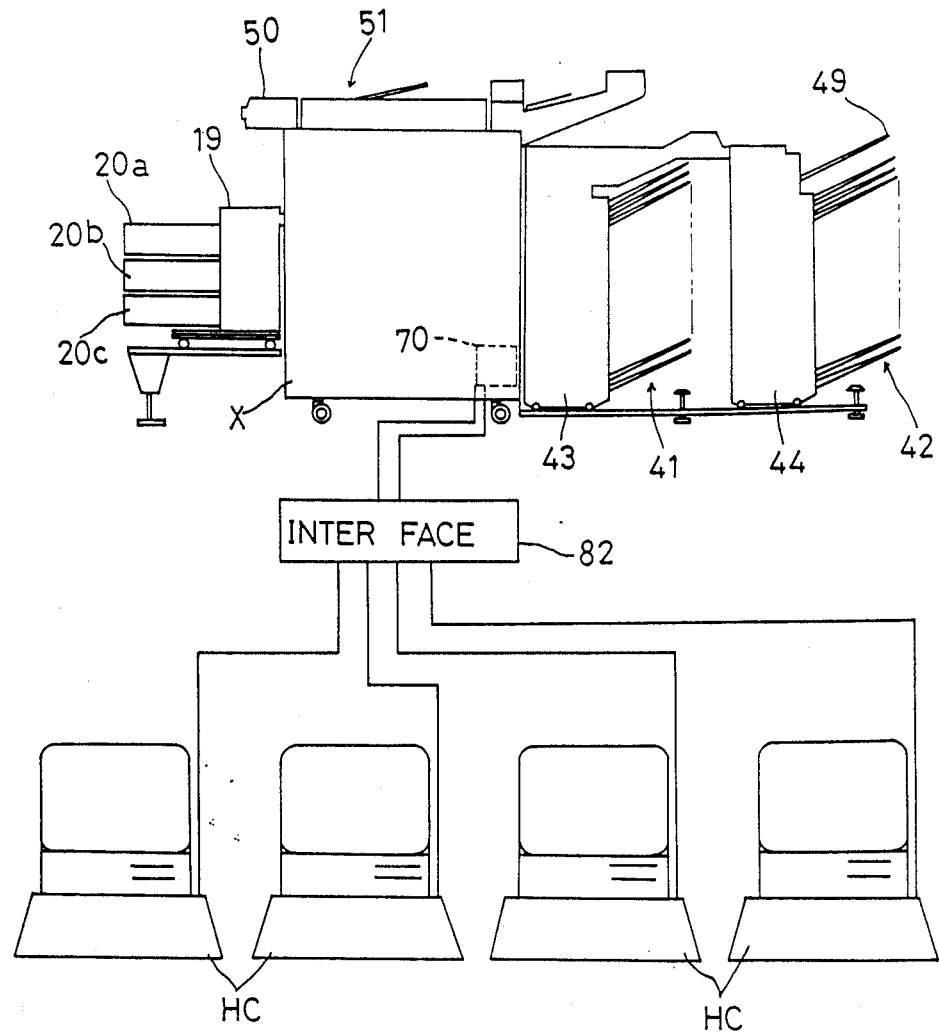
FIG. 4 is a a schematic illustration of a recording system.

As shown in FIG. 4, the recording apparatus is connected through an interface 82 to office machines HC such as host computers and word processors. The forwarding mechanism FM supplies to the automatic document feeder 51 a selected number of hard copies output from the above-mentioned printing system in response to printing information received from one of the office machines HC. When a plurality of hard copies are required, the printing system first outputs one hard copy which is then supplied to the automatic document feeder 51 as an original document to be copied by the copying system for producing the remaining number of hard copies. This mode of hard copy production minimizes the time required for signal transmission from the host computer or word processor to the printing system, thereby promptly making the host computer or word processor available for other operations.

This construction allows sheets of the recording paper P emerging from the printing process to be stored on the document feed tray 52 once, duplicate copies of the recording paper P being produced thereafter by operating the automatic document feeder 51. When a plurality of hard copies in many pages are desired, therefore, only one hard copy each of those pages may be output in a continuous printing operation carried out as an initial step, regardless of the number of copies. After this step, the host computer or word processor may continuously be used for other purposes.

Furthermore, when obtaining one hard copy each of a plurality of pages, the forwarding mechanism FM is used to discharge the hard copies face down onto the document feed tray 52, which advantageously results in an automatic arrangement of the copies in the order of page numbering.

The recording paper P having passed through the fixing device 22 is drawn therefrom by a transport roller pair 22, and is guided to a first switch lever 30 for switching transport directions in accordance with copying and Printing conditions. The switch lever 30 is operable to direct the recording paper P to a paper discharge passage 31 leading outwardly of the main body X, to a bypass passage 32 leading to an inlet of the transfer device 9, or to the forwarding passage 58 leading to the automatic document feeder 51.

Specifically, the first switch lever 30 switches the transport of recording paper P as follows:

When a single original document M is copied onto one side of the recording paper P (which operation is hereinafter referred to as the "simplex copying mode") or when only one hard copy is output (which operation is hereinafter referred to as the "single printing mode"), the first switch lever 30 is moved to a position to guide the recording paper P from the fixing device 22 to the discharge passage 31. As a result, the recording paper P is discharged by a discharge roller pair 33 outwardly of the main body X.

The first switch lever 30 is moved to a position to guide the recording paper P from the fixing device 22 to the bypass passage 32 when one or two original documents is/are copied onto both sides of the recording paper P (which operation is hereinafter referred to as the "duplex copying mode"), when parts of the document or documents are copied in combination onto one side of the recording paper P (which operation is hereinafter referred to as the "composite copying mode"), or when the recording paper P carrying a duplicate image of a document M is printed with other information by means of the optical printing head PH (which operation is hereinafter referred to as the "composite printing mode"). As a result, the recording paper P is returned to the inlet of the transfer device 9 as will be described later.

Further, the first switch lever 30 is moved to a position to guide the recording paper P from the fixing device 22 to the forwarding passage 50 when a first hard copy is output in order to obtain a plurality of hard copies (which operation is hereinafter referred to as the "document printing mode"). As a result, the recording paper P is fed into the forwarding passage 58 to be supplied to the document feed tray 52 of the automatic document feeder 51.

The bypass passage 32 includes an intermediate tray 34 for temporarily storing the recording paper P guided into the bypass passage 32. In the composite copying and composite printing modes, the recording paper P is delivered to the intermediate tray 34 by two transport roller pairs 35a and 35b. in the duplex copying mode, the recording paper P is guided by a second switch lever 36 disposed at a position just short of the intermediate tray 34, to proceed into a reversing passage 38 including two transport roller pairs 37a and 37b. In this case, the recording paper P is delivered to the intermediate tray 34 after being turned over by the reversing passage 38.

The recording paper P is picked up from the intermediate tray 34 by a pickup roller 39 with commencement of a copying operation for the second side in the case of the duplex copying mode or commencement of a second copying or printing operation in the case of the composite copying or printing mode. The recording paper P then passes through a control roller pair 40, and enters the paper feed passage 17 leading to the transfer device 9.

In the duplex copying mode, composite copying mode and composite printing mode, the recording paper P is fed to the transfer device 9 under the synchronizing control by the timing roller pair 18 to have a toner image transferred thereto from the photoreceptor drum 6 as in the simplex copying and single printing modes. Subsequently, the toner image is fixed to the recording paper P by the fixing device 22, and the recording paper P is discharged outwardly of the main body X through the discharge passage 31 having the discharge roller pair 33.

A first sorter 43 and a second sorter 44 are disposed laterally of the main body X in opposed relationship to the discharge passage 1. The first and second sorters 43 and 44 each include bins 41 or 42 in 20 stages for storing, in groups, plural sheets of recording paper P discharged from the main body X. The first sorter 43 further includes an intake roller pair 45 opposed to the discharge roller pair 33 of the main body X, a distributing passage 46 vertically movable for delivering the sheets of recording paper P to appropriate bins 41, and a transport passage 47 for transporting the recording paper P to the second sorter 44.

The second sorter 44 includes a distributing passage 48 vertically movable for delivering the sheets of recording paper P received from the first sorter 43 through the transport passage 47 to appropriate bins 42, and a discharge tray 49 for receiving the recording paper P not arranged or grouped by using the bins 41 and 42 of the two sorters 43 and 44.

The sheets of recording paper P discharged from the main body X pass through the intake roller pair 45 of the first sorter 43. Thereafter the sheets are delivered through the distributing passage 46 of the first sorter 43 to the bins 41 of the first sorter 43, through the transport passage 47 of the first sorter 43 and the distributing passage 48 of the second sorter 44 to the bins 42 of the second sorter 44, or through the transport passage 47 of the first sorter 43 to the discharge tray 49 of the second sorter 44.

Description will now be made of movement of the recording paper P which takes place when a plurality of hard copies are produced in the document printing and simplex copying modes, in accordance with the image information received from the host computer or word processor.

Figure 5A:
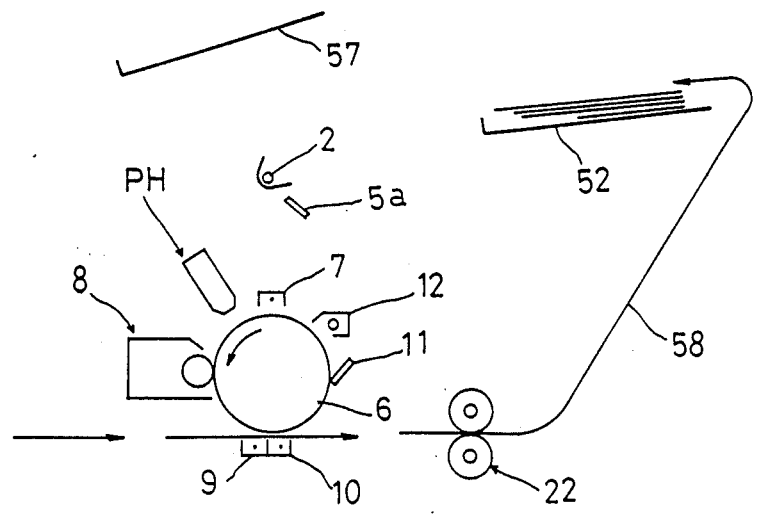
FIGS. 5A and 5B are schematic illustrations showing movement of recording paper, respectively.

FIG. 5A illustrates movement of the recording paper P in the document printing mode. In this mode, the sheets of recording paper P act as hard copies in plural pages carrying toner images developed from electrostatic latent images formed by the optical printing head PH. The sheets of recording paper P, after passing through the fixing device 2B, successively move through the forwarding passage 58 to be stacked on the document feed tray 52 of the automatic document feeder 51.

Figure 5B:
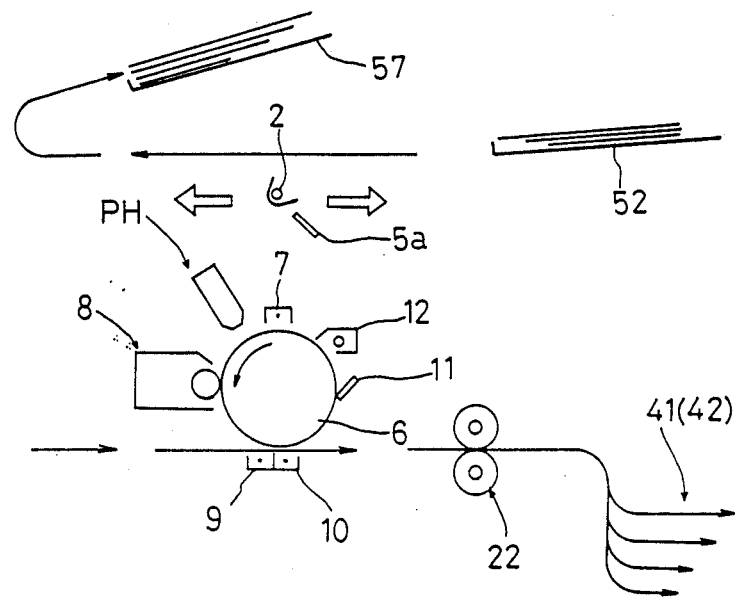

After a predetermined number of printed sheets of recording paper P are forwarded to the document feed tray 52, the operation is switched by a control system C, which will be described later, from the document printing mode to the simplex copying mode. Then, as shown in FIG. 5B, the sheets of recording paper P are supplied one after another onto the document table 1 by the transport mechanism TM of the automatic document feeder 51. The copying operation is repeated the number of times corresponding to a desired number of hard copies less one, for each sheet of recording paper P. Sheets of recording paper P on which the images are copied from the sheets placed on the document table 1 are successively delivered to the bins 41 or 42 of the first or second sorter 43 or 44. Each sheet of recording paper P placed on the document table 1 is discharged onto the document discharge tray 57 after completion of its copying operation.

Thus, the above operations in the document printing and simplex copying modes produce a plurality of hard copies. The control system C for controlling these and other operations will be described next.

Figure 6A:
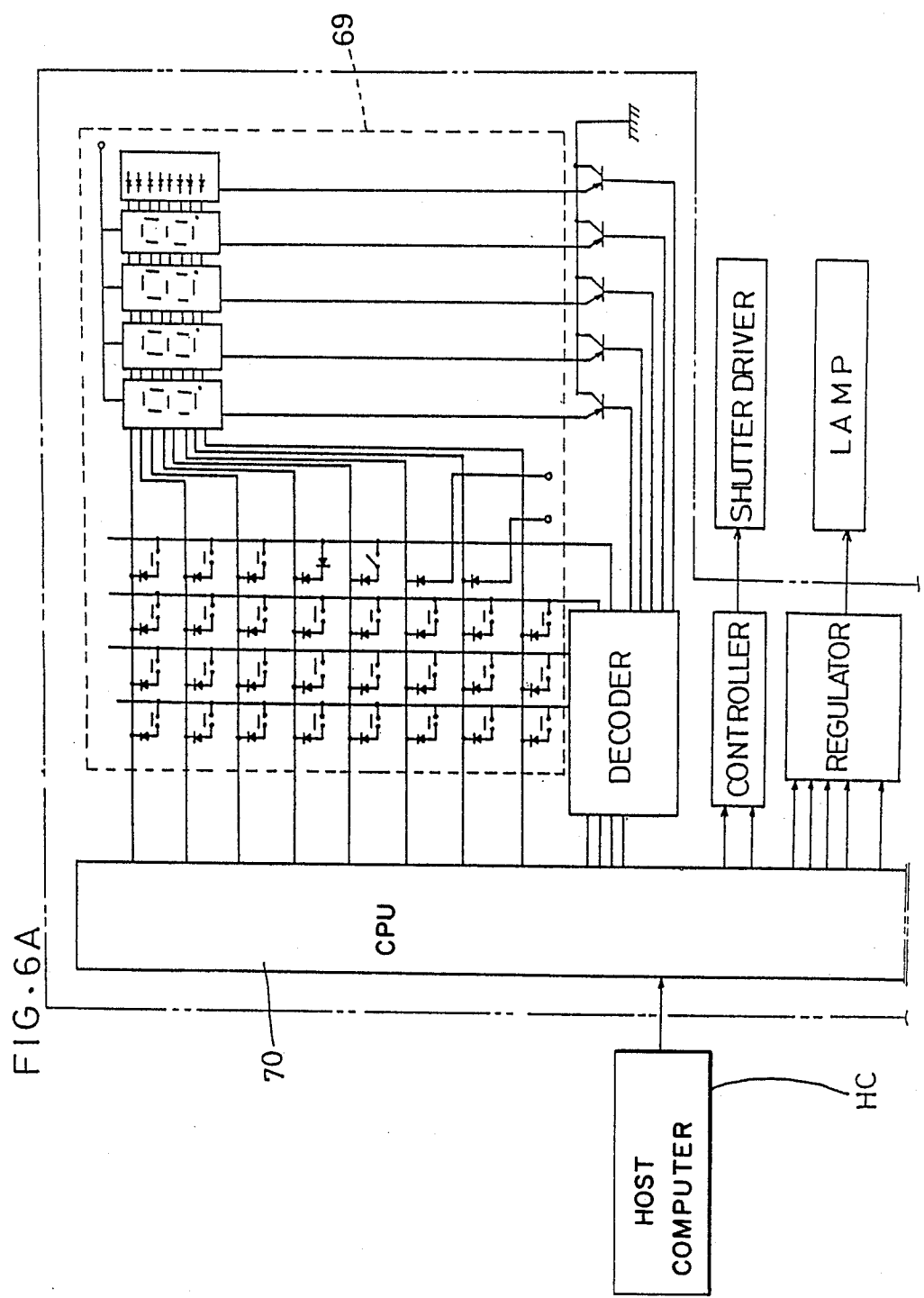

FIGS. 6A and 6B are block diagrams which, in combination, illustrate the control system C of the electrophotographic recording apparatus.

The control system C includes the CPU 70 of a microcomputer as a principal component thereof. The CPU 70 determines copying and printing conditions in response to inputs made through various keys on a control panel 69, and causes the conditions to be displayed.

The CPU 70 actuates a controller 71 for controlling the shutter driver circuits 64 of the optical printing head PH, a lamp regulator 72 for controlling the exposure lamp 2, a controller 73 for controlling a DC motor DM to drive the scanning device S, a controller 74 for controlling a stepper motor SM to vary the optical path length of the image forming optical system I, controllers 75–77 for controlling the charging device 7, transfer device 9 and separating device 10, respectively, a controller 78 for controlling temperature of the fixing device 28, a lamp regulator 79 for controlling the eraser lamp 12, a controller 80 for controlling the forwarding mechanism FM, and clutches and the like, not shown, for driving the various rollers to transport the recording paper P.

A bit map memory 81 having a storage capacity corresponding to one stage is connected to the CPU 70 for storing in a developed form the printing information input from the external host computer HC. The CPU 70 reads out the printing information in a selected order and actuates the shutter drive controller 71. The shutters of the optical printing head PH corresponding to the pixels, respectively, are thereby driven to form an electrostatic latent image on the photoreceptor drum 6 in accordance with the printing information.

The controller 80 for controlling the forwarding mechanism FM, when carrying out an operation in the document printing mode, receives a control signal from the CPU 70 every time one printing operation is completed by the printing system. The forwarding mechanism FM is thereby driven to forward the recording paper P emerging from the printing process to the document feed tray 52 of the automatic document feeder 51. Thus the CPU 70 acts as control means according to the present invention.

The controller 73 for controlling the DC motor DM causes the scanning device S to move forward, return and stop in response to drive control signals output from the CPU 70. This controller 73 also receives a shaped pulse signal from an optical encoder attached to the DC motor DM, and transmits the pulse signal to the CPU 70. On the basis of this signal, the CPU 70 determines a current position of the scanning device S.

The controller 74 connected to the stepped motor SM for driving the image-forming optical system I is operable in response to drive control signals received from the CPU 70, for driving the image-forming lens 4 and the fourth mirror 5d back and forth to establish an optical length providing a selected magnification.

In the event that a copying or printing operation does not take place within a predetermined time (for example, three minutes) after a particular copying or printing condition is selected or after one copying or printing operation is carried out under a particular copying or printing condition, the CPU 70 automatically cancels this copying or printing condition in favor of a standard condition. This function is called an auto reset function.

In the document printing and other printing modes and in the simplex and other copying modes, the various components of the printing and copying systems are switchable by control signals output from the CPU 70. The resulting states of these components are set out in Table 1 below. In the table, "ON" represents an operative state and "OFF" an inoperative state.

TABLE 1

| Modes of Operation | Recording | Copying |
| --- | --- | --- |
| Charging Device 7 | ON | ON |
| Printing Head PH | ON | OFF |
| Scanning Device S | OFF | ON |
| Developing Device 8 | ON | ON |
| Transfer & Separating Devices 9 and 10 | ON | ON |
| Cleaning Device 11 | ON | ON |
| Eraser Lamp 12 | ON | ON |
| Fixing Device 28 | ON | ON |
| Document Feeder 51 | OFF | ON |

How this electrophotographic recording apparatus operates will be described next with reference to the flow charts shown in FIGS. 7, 8A and 8B.

Figure 7:
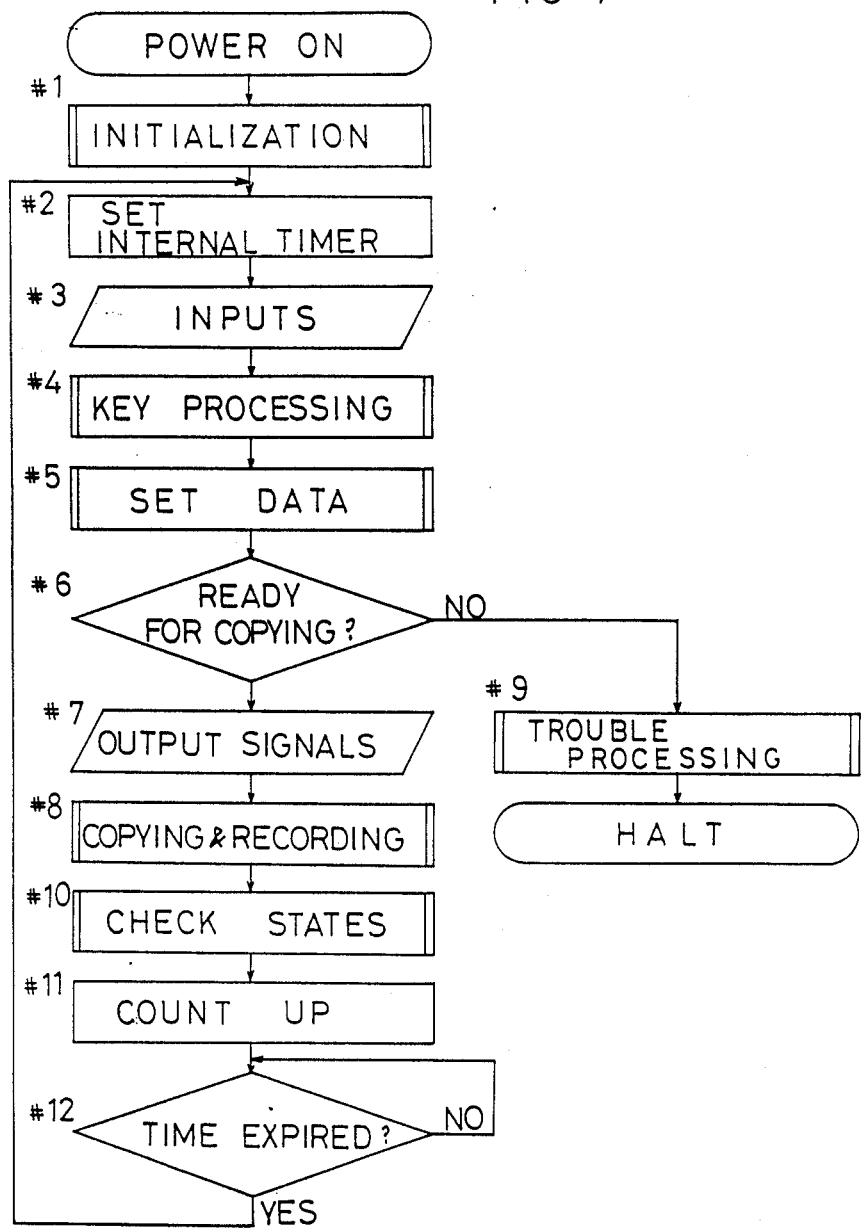

FIG. 7 shows a main routine for controlling an overall copying and printing operation. The main routine starts when the apparatus is switched on, to carry out initialization at step #1 for clearing all registers and flags in the CPU 70 and a RAM and the like and setting a standard copying condition. Thereafter, an internal timer is set for determining the length of one routine at step #2.

Next, at step #3, inputs are made through the keys on the control panel 69 and through switches and sensors provided at other positions of the apparatus. At step #4, a key processing subroutine is called for changing the copying or printing condition in response to the inputs made through the keys on the control panel 69. At step #5, a data setting subroutine is called for setting data to be displayed on a display device not shown.

Subsequently, judgment is made at step #6 whether the apparatus is in order for starting a copying or printing operation or any abnormality or trouble has occurred. In the absence of trouble, control and display signals are output at step #7, and a copying and printing subroutine is called at step #8 to carry out copying and printing operations under the various conditions set to the apparatus.

If trouble is found at step #6, a trouble processing subroutine is called at step #9 for stopping the devices taking part in the copying or printing operation and for giving a display that trouble has occurred. After removal of the trouble, the program waits for a reset button to be pressed.

After a return from the copying and printing subroutine, checking Is made at step #10 as to various stages of the recording apparatus, i.e. presence or absence of developing toner in the developing device presence or absence of copying paper P in the paper feed cassettes 12a and 12b, the temperature of fixing rollers in the fixing device 20, and so on. After the internal timer finishes counting at step #11, the program stands by at step #12 until the time set to the timer expires. Upon expiration of the time, the program returns to step #2 and repeats the foregoing sequence.

Figure 8B:
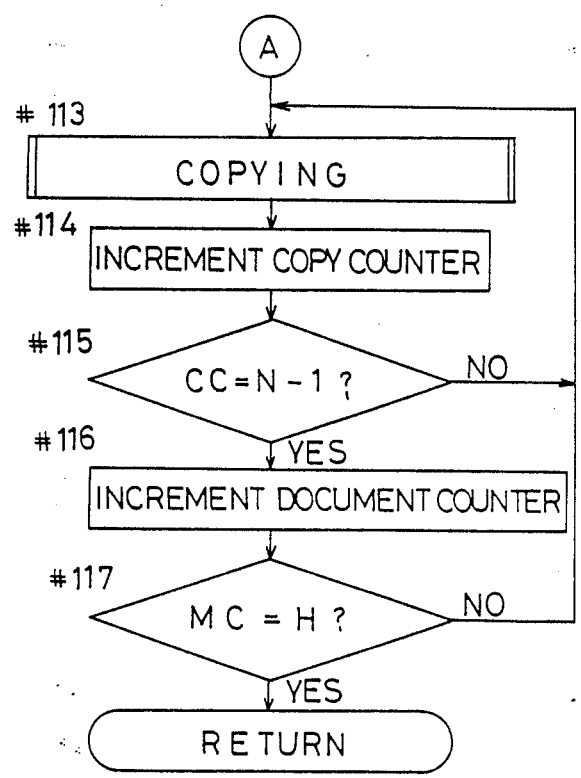

FIGS. 8A and 8B show a flow chart of a hard copy outputting operation for producing hard copies in the document printing and simplex copying modes, which forms part of the copying and printing subroutine called at step #8.

When this subroutine is called, the operating mode is switched to the printing mode, prohibiting a copying operation. Specifically, the operation of the exposure lamp 2 and scanning device S is prohibited at step #101. Thereafter, checking is made at step #102 whether the document feed tray 52 of the automatic document feeder 51 is empty or not. If the document feed tray 52 is not empty, a "document removal request signal" is output at step #103 for giving a display that the documents should be removed from the document feed tray 52, and the program returns to step 102. If the document need tray 52 is empty, a comparison is made at step #104 between the number N of hard copies set in the key processing subroutine called at step #4 and the number of bins in the two sorters 43 and 44.

The program just moves to step #106 if the number N of hard copies is smaller than the number of bins. If the number N of hard copies is greater than the number of bins, the program moves to step #106 after causing an alarm signal to be output at step #105 for giving an alarm display. Then a start of printing request signal is output at step #106 and a printing operation is carried out for each page at step #017. At step #108, the recording paper P emerging from the printing process is forwarded to the document feed tray 52 of the automatic document feeder 51. Thereafter a print counter PC is incremented at step #109. Next, checking is made at step #110 whether the count of the print counter PC has reached the number H of hard copy pages or not. Steps #107 and #109 are repeated until the count reaches the number H of hard copy pages.

When it is judged that one copy each of the hard copy pages has been output with the count having reached the number H of hard copy pages, the number N of hard copies is checked at step #111. If the number of hard copies is "1", the program returns to the main routine. If the number N of hard copies is not "1", the operating mode is switched to the copying mode at step #112.

Thereafter, at step #113, the automatic document feeder 51 is operated for causing the transport mechanism TM to supply one printed copy now acting as an original document from the document feed tray 52 to the document table 1 for copying. Thereafter a copy counter CC is incremented at step #114. These hard copies acting as the original documents may be used as part of the plurality of hard copies to be produced. Therefore, checking is made at step #115 whether the count of copy counter CC has reached an actual number of copies (N minus 1) or not. Steps #113 and #114 are repeated until the count reaches the actual number of copies.

When it is judged that a required number of duplicates of each hard copy page have been produced with the count of the copy counter CC having reached the actual number N-1 of copies, a document counter MC is incremented at step #116. Steps #113 to #116 are repeated until the count of the document counter MC reaches the number H of hard copy pages.

The program returns to the main routine when the count of the document counter CC reaches the number of hard copy pages, indicating that a required number of duplicates of all hard copy pages, have been produced.

Other embodiments of the present invention are set out hereinafter.

(1) The printing system in the foregoing embodiment includes the optical printing head PH having the PLZT shutter array 62. The optical printing head PH may have a liquid crystal shutter array or a LED array instead. Further, the optical printing head PH may comprise the type to emit light beams such as laser beams to the photoreceptor drum 6.

(2) The DC motor D provided in the foregoing embodiment for driving the scanning device S may be replaced by a stepper motor or various other types of motors. Where a stepper motor is employed, pulses for driving this motor may be counted. Then the position of the scanning device S may be detected without necessitating an optical encoder as in the described embodiment.

(3) The photoreceptor drum 6 may be replaced by a belt-like photosensitive element wound around a pair of rollers.

(4) In the foregoing embodiment, the exposure lamp 2 and slit S are movable while the document M is held stationary on the document table 1. Alternatively, the present invention may be practiced such that the copying system has the exposure lamp 2 and slit 3 fixed against movement, with the document table 1 designed movable.

(5) When a single hard copy is obtained in the foregoing embodiment as when a plurality of hard copies are obtained, a hard copy produced by the printing system is forwarded and discharged to the document feed tray 52 by using the forwarding mechanism FN. However, the hard copy may be discharged directly to the paper discharge tray.

Further, the printing system in the foregoing embodiment acts as a page printer for printing one page after once storing printing information corresponding to that page in the bit map memory 81. This printing system may be operated repeatedly when producing a plurality of single-page hard copies.

Figure 9:
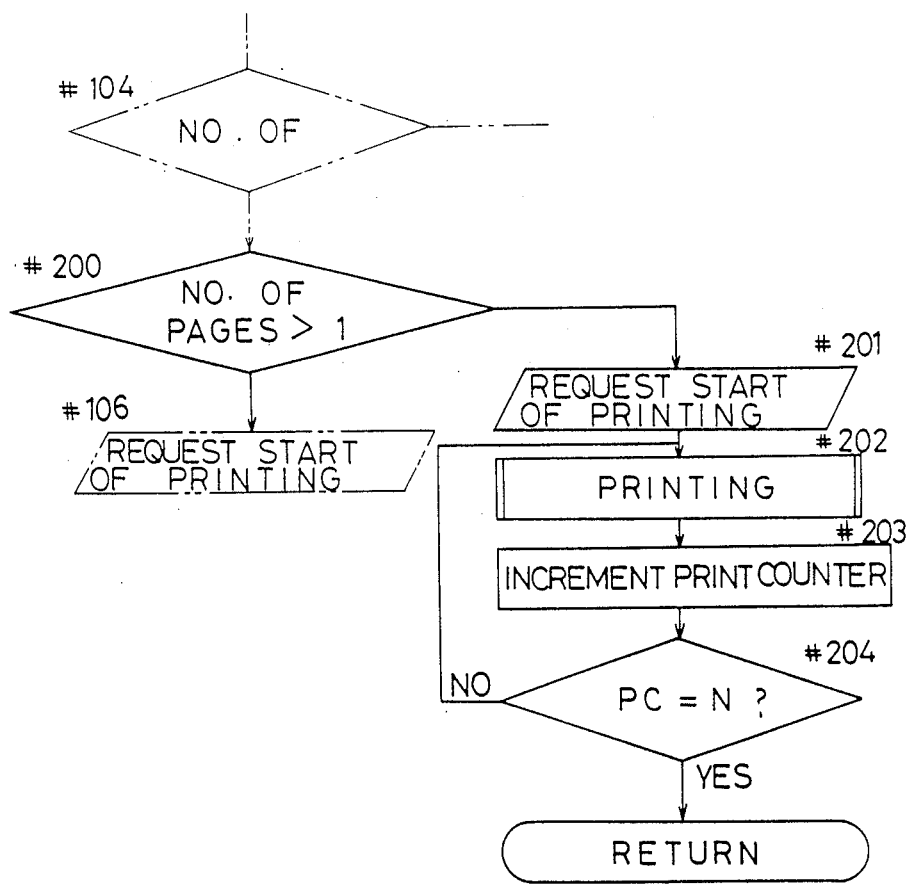
FIG. 9 is a partial flow chart illustrating operation of the recording apparatus according to a modified embodiment.

In this case, the control sequence, as shown in the flow chart of FIG. 9, includes step #200 between steps #104 and #106 for checking whether the number H of hard copy pages is more than "1" or not. If the number H is "1", the program branches off to carry out the following operation. If step #200 finds the number H to be more than "1", the program moves to step #106 for outputting a start of print request signal as already described.

The result that the number H of hard copy stages is "1" indicates that the printing system prints one page after once storing and developing printing information corresponding to that page in the bit ma memory 81. Thus, after outputting the start of print request signal at step #201, one-page printing is carried out at step #202. Subsequently, the print counter PC is incremented at step #203, and its count is checked at step #204. Steps #201 to #203 are repeated until the count reaches the number H of hard copies. When the count of the print counter PC reaches the number H, the program returns to the main routine.

(6) In the foregoing embodiment, both the copying system and printing system utilize the electrophotographic process and share the same components excluding the construction for exposing the photosensitive member 6, to realize a low cost apparatus. However, the present invention may be practiced by providing a copying system and a printing system totally independent of each other. For example, even where the two systems utilize the electrophotographic process, each system may have a photosensitive member 6 and a fixing device 22 of its own. The printing system may comprise the ink jet type or thermal transfer type, with the copying system comprising the electrophotographic type. In this case, as distinct from the foregoing embodiment, a copying operation may be started as soon as the first page of hard copy is output and forwarded to the document feed tray 52, without waiting until all the hard copies in a plurality of pages are output.

(7) The automatic document feeder ADF is used in the foregoing embodiment as automatic document supplying means. However, a recirculating automatic document feeder (RADF) as shown in FIG. 1 of U.S. Pat. No. 4,786,039 may be employed instead. The recirculating automatic document feeder has a face-up document tray on which the image-carrying face of a document is placed face up. It is therefore necessary that recording paper with an image formed thereon by the recording system be fed to the transport means after storing it in a reversed state on the intermediate tray, or that the transport means include a reversing device.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A recording apparatus, comprising:
   copying means for projecting an image of an original document onto a charged photosensitive member through an optical system to form an electrostatic latent image on the photosensitive member, developing the electrostatic latent image and transferring and fixing a resulting visible image onto recording paper;
   printing means for forming an electrostatic latent image on said photosensitive member in response to image information, said printing means including a light source, a PLZT shutter array, and shutter drivers for controlling respective shutters of said PLZT shutter array in response to the image information, whereby light beams are allowed by the image information to pass through said shutters to form the electrostatic latent image on said photosensitive member;
   document feed means for feeding the original document for exposing by said optical system;
   transport means for transporting the recording paper with the visible image fixed thereto to said document feed means to sue said recording paper as the original document;
   paper discharge means for discharging the recording paper with the visible image fixed thereto; and
   selecting means for selectively delivering the recording paper with the visible image fixed thereto to said transport means or said paper discharge means.

2. A recording apparatus as claimed in claim 1, wherein said document feed means includes a document feed tray for supporting a plurality of original documents, and a feeder for automatically feeding one original document after another from said document feed tray to a predetermined position, said transport means being operable to transport the recording paper with the visible image fixed thereto to said document feed tray 3. A recording apparatus as claimed in claim 2, wherein said transport means is operable to stack the recording paper with the visible image fixed thereto on said document( feed tray, with an image-carrying side of the recording paper facing down.

4. A recording apparatus as claimed in claim 1, further comprising bypass transport means including an intermediate tray for temporarily storing the recording paper with the visible image fixed thereto, said bypass transport means being operable to feed the recording paper printed or copied in accordance with the image information or the original document, with an image carrying side of the recording paper facing up or down, to said copying means for a further printing or copying operation based on the same or different image information or original document.

5. A recording apparatus as claimed in claim 1, wherein said selecting means selects said transport means when a printing operation is carried out by said printing means, for transporting the recording paper printed in accordance with the image information.

6. A recording apparatus as claimed in claim 1 wherein said paper discharge means is connected to sorting means.

7. A recording apparatus, comprising:
copying means for projecting an image of an original document onto a charged photosensitive member through an optical system to form an electrostatic latent image on the photosensitive member; developing the electrostatic latent image and transferring and fixing a resulting visible image onto recording paper;
printing means for forming an electrostatic latent image on said photosensitive member in response to image information, said printing means including a light source, a PLZT shutter array, and shutter drivers for controlling respective shutters of said PLZT shutter array in response to the image information, whereby light beams are allowed by the image information to pass through said shutters to form the electrostatic latent image on said photosensitive member;
document feed means for feeding the original document for exposing by said optical system;
paper discharge means for discharging the recording paper with the visible image fixed thereto;
transport means for transporting the recording paper with the visible image fixed thereto to one of said document feed means or said paper discharge means; and
transport control means for controlling said transport means, said transport control means being operable when a printing operation is carried out by said printing means, for causing said transport means to transport the recording paper printed in accordance with the image information to said document feed means.

8. A recording apparatus comprising:
copying means for producing a copy of an original document;
printing means for forming a series of images on a respective series of recording papers according to electrical image information successively provided to the printing means;
document support means capable of supporting a stack of original documents to be copied;
document feed means of feeding the original documents from said document support means one by one to said copying means;
paper transport means for transporting the series of recording paper, with the images formed on each one, to said document support means to sue said recording papers as a set of original documents, and
control means for providing multiple copies of each of a series of successively printed recorded papers including means for printing all of the series of images on the recording papers at an initial cycle of operation and means for subsequently copying duplicates of the recording papers at a subsequent cycle of operation.

9. A recording method comprising the steps of:
forming page images on recording papers according to electrical image information;
transporting the recording papers with the page images to a document tray;
feeding the recording papers on the document tray one by one to a copying section, and
producing a copy of the respective recording papers in the copying section.

10. A recording apparatus comprising:
a photosensitive member;
means for charging said photosensitive member;
projection means for illuminating an original document and projecting an image of the original document onto the charged photosensitive member to form an electrostatic latent image thereon;
printing means for forming an electrostatic latent image on said photosensitive member in response to image information;
means for developing the electrostatic latent image to thereby form a visible image;
means for transferring and fixing the visible image onto a recording paper;
document support means capable of supporting a stack of original documents;
document feed means for automatically feeding the original documents from said document support means one by one to an illumination station of said projecting means;
paper transport means for transporting the recording paper with the visible image fixed thereto to said document support means to use said recording paper as an original document;
paper discharge means for discharging the recording paper with the visible image fixed thereto, and
means for selectively delivering the recording paper with the visible image fixed thereto to said paper transport means and paper discharge means.

* * * * *